United States Patent [19]

Loos et al.

[11] 4,447,461

[45] May 8, 1984

[54] SAUCE COMPOSITIONS CONTAINING AGGLOMERATED PARTICLES OF SPECIFIED SIZE DISTRIBUTION

[75] Inventors: Patricia J. Loos, Glendale; Debra L. Fuqua, Wyoming; Paul J. Drzewiecki, Cincinnati, all of Ohio

[73] Assignee: The Procter & Gamble Company, Cincinnati, Ohio

[21] Appl. No.: 478,120

[22] Filed: Mar. 30, 1983

Related U.S. Application Data

[63] Continuation-in-part of Ser. No. 370,806, Apr. 22, 1982, abandoned.

[51] Int. Cl.³ .............................................. A23L 1/22
[52] U.S. Cl. .................................... 426/589; 426/652; 426/574; 426/656; 426/104; 426/802
[58] Field of Search ............... 426/589, 104, 574, 656, 426/802, 638, 652, 650

[56] References Cited

U.S. PATENT DOCUMENTS 3,961,083  6/1976  Coleman ............................. 426/92
4,369,195  1/1983  Nelson ................................. 426/104
4,414,237  11/1983  Evans ................................. 426/589

FOREIGN PATENT DOCUMENTS 5347559  11/1976  Japan .
53-115838  6/1977  Japan .
1142151  3/1969  United Kingdom .

OTHER PUBLICATIONS

Soy Protein Recipe Ideas, *Institution/Volume Feeding Management Magazine*, Cahners Books, Massachusetts 1975.

*Primary Examiner*—Jeanette M. Hunter
*Attorney, Agent, or Firm*—Michael J. Roth; Rose Ann Dabek; Richard C. Witte

[57] ABSTRACT

Vegetable protein particle-containing sauces, such as spaghetti sauces, which are organoleptically superior to the same sauces containing real meat can be prepared by providing protein particles having a specified particle size distribution. This is preferably accomplished by agglomerating finely comminuted protein particles with binder in a heating step.

11 Claims, No Drawings

SAUCE COMPOSITIONS CONTAINING AGGLOMERATED PARTICLES OF SPECIFIED SIZE DISTRIBUTION

RELATED APPLICATION

This is a continuation-in-part application of Ser. No. 370,806, filed Apr. 22, 1982 now abandoned.

TECHNICAL FIELD

This invention relates to meat-type sauces, such as spaghetti sauces, taco sauces, barbecue sauces, chili sauces, and the like. These have frequently been prepared in the past, using ground meat, by preparing a base sauce, browning the ground meat, and adding the resulting ground meat to the base sauce. This has generally been the practice both in the home and at the commercial level.

Ground or chopped meat provides the desired meaty flavor and a desirably chewy and fibrous texture. However, inherent in the preparation of chopped or ground meat, is the comminution of the starting meat material to a relatively uniform particle size.

It has now been discovered that consumers have an organoleptic preference for meat sauces in which the meat particles, or particles simulating meat, have a rather broad particle size distribution, including substantial percentages of both relatively large, and relatively fine particles, which reinforce a "meaty" organoleptic impression.

It is an object of this invention to provide a sauce product resembling a natural meat sauce, but having a desirably broad particle size distribution.

It is another object of this invention to provide a sauce produce resembling natural meat sauce, but preferred to the same sauce containing natural meat, by virtue of having a preferred particle size distribution.

BACKGROUND ART

U.S. Pat. No. 3,961,083, issued June 1, 1976 to H. E. Coleman, and partially assigned to Marian Berkely, describes a sauce product containing a textured vegetable protein meat analog. In the '083 patent, a meat-flavored textured vegetable protein containing absorbed rendered animal fat is preferably mixed with sauce in a barbecue product from which sandwiches, "sloppy joes", and the like, can be made. However, like the rest of the art, the '083 patent suggests the use of meat analog as a direct substitute for meat, rather than an improvement over meat. Thus, it is an object of the '083 patent to produce particles of meat analog about the size of chopped beef by starting with analog chunks and comminuting them.

DISCLOSURE OF THE INVENTION

The compositions of this invention contain two principal ingredients: (1) a "meat analog" prepared from textured vegetable protein, and (2) a base sauce. While the sauce can be virtually any conventional sauce, including taco sauce, spaghetti sauce, stroganoff sauce, chili sauce, meat gravy, etc., an important component of the organoleptic acceptability of this composition is the meat analog, having a preferred particle size distribution.

The term "meat analog" and "textured protein simulating loose cooked ground meat" are intended to include textured vegetable protein materials, well known to the art, as well as textured single cell proteins. Mixtures of textured vegetable protein or textured single cell protein with up to 70%, but preferably less than 50%, of materials of animal origin, including egg albumen, meat, meat juices, serum, blood, meat by-products, hydrolyzed animal protein, and the like are also included. The textured protein is most preferably a textured vegetable protein.

This invention provides a sauce containing at least about 7% by volume of textured protein simulating loose cooked ground meat, the textured protein having a particle size distribution of (a) from 0% to about 2% by weight on a 15.9 mm screen; (b) from about 6% to about 20% by weight on a 12.7 mm screen; (c) from about 9% to about 18% by weight on a 9.51 mm screen; (d) from about 27% to about 37% by weight on a 5.66 mm screen; and (e) from about 25% to about 40% by weight through a 4.76 mm screen, provided that the sum of (a), (b), (c) and (d) is from about 48% to about 72%.

A preferred product in accordance with this invention is a sauce containing at least about 21% by volume textured vegetable protein simulating meat, the textured vegetable protein having a particle size distribution of (a) all particles through a 15.9 mm screen; (b) about 14% on a 12.7 mm screen; (c) about 15% on a 9.51 mm screen; (d) about 33% on a 5.66 screen; and (e) about 30% through a 4.76 mm screen. In addition, a preferred product has a whole product Bostwick viscosity of from about 2.0 to about 5.0.

It should be understood that these percentage distributions need not account for 100% of the analog in the sauce. In particular, it has been determined that the percentage of "intermediate" particles, i.e., those passing through a 5.66 mm screen and retained on a 4.76 mm screen, is relatively unrelated to consumer preference and perception of meatiness. Where the total weight percent of particles in the specified size ranges is not 100%, it is intended that the balance is this "on 4.76 mm" fraction.

One skilled in the art will understand that the screen openings are standard mesh screens. The actual measured openings can vary. For example, a 15.9 mm screen may actually measured between 15.7 mm and 16.1 mm.

In a preferred embodiment of this invention, a meat analog is prepared by (1) extrusion cooking soy concentrate to prepare an extrudate; (2) comminution of the extrudate; (3) mixing the resulting extrudate with a water slurry of binder; (4) frying the mixture in edible fat or oil to produce an agglomerate mat; and (5) sizing the agglomerate mat to produce a finished analog having the preferred article size distribution when removed from the sauce in which it is mixed for consumption.

In general, the term "agglomeration" when used herein refers to the process of making large meat analog particles from smaller ones by mixing or coating the smaller particles with any of the variety of proteinaceous binders known to the art, and subsequently heat-setting the binder.

It can be seen that this process is the functional opposite of the process by which ground beef is prepared for incorporation in sauces. In the preparation of ground beef, large cuts of beef are successively size-reduced. This process continues through the browning step, resulting in a product with a relatively uniform particle size. In contrast, the process of this invention starts with a powdered soy protein material, and through a sequence of process steps assembles analog particles of greater size and greater size diversity.

Sizing and screening are widely applied chemical engineering unit operations, and are described in such textbooks as *Elements of Chemical Engineering*, Badger and McCabe (McGraw-Hill, New York, 1936), which is hereby incorporated herein by reference. In a preferred practice of this invention, a fried agglomerate mat is fed to a commercial vibratory screen series, such as Sweco vibro-energy separator, Model S30S666, manufactured by Southwestern Engineering Company, Los Angeles, Calif. The product of this commercial separator is a series of analog particle fractions of varying size, as described above. These fractions are then recombined in sauce in proportions which yield the desired final particle size distribution.

The particle size distribution is measured by the following technique.

A 1000 ml. quantity of sauce is divided into two portions. Each portion is treated by placing it in a 1500 ml. container which is then filled with a broken stream of warm water (about 45° C.). The container is sealed and inverted gently about 15 times, one time per second, to insure mixing. The resulting slurry is poured through a clean 2.00 mm screen. The container is rinsed with another 175 ml. of water, which is also poured onto a clean area of the screen. The screen is tapped gently by hand to remove water and sauce and emptied onto a clean pan. The resulting analog from both portions of sauce is placed in a 1000 ml. container, which is filled with warm water, sealed, and mixed by inverting the container 10 times as above. The resulting slurry is poured through a clean 2.00 mm screen which is again gently tapped to remove free water and sauce.

This latter wash-and-screen process is repeated two more times, and then the screen is gently tapped by hand for about 15 seconds to remove water and to level the analog on the screen. The screen is allowed to drain undisturbed for approximately 3 minutes, after which the bottom of the screen is blotted with towels, pressed firmly against the screen, until the towels come away dry. The analog is poured, over a period of about 10 seconds, on a stack of standard screens in descending order of opening size: 15.9 mm, 12.7 mm, 9.51 mm, 5.66 mm, 4.76 mm and base, mounted on a mechanical shaker, while the screens are shaking. A Tyler Model RX24 portable sieve shaker is preferably used. Thirty seconds after the start of pouring, the shaker is stopped, the screens and base are removed, and the contents of each is weighed. The weight of analog on each screen (and base) is divided by the total weight of the analog from all the screens to obtain the particle size distribution percentages.

The analog fractions thus obtained can then be combined and the total analog volume determined by simple displacement of water in a graduate. From this, the volume percent analog can be determined.

It has been determined that the bulk volume of meat analog, relative to total sauce, correlates more closely to consumers' impression of "amount of meat" in the sauce than does analog weight.

Because various textured vegetable proteins differ in density, and may differ, in turn, from ground beef, volume of analog as a percentage of total sauce volume is a preferred measure of sauce analog content. The products of this invention will contain at least about 7% by volume of analog, preferably at least about 21% by volume.

Bostwick viscosity is measured by heating the sauce product and the Bostwick viscometer until both reach a temperature of 140° F. The horizontally level viscometer cavity is filled to the rim with the sauce product, and the gate is tripped. The point of maximum flow of the product on the Bostwick scale is read after 30 seconds. A preferred viscometer is a Consistometer made by Central Scientific Company, Chicago, Ill.

INDUSTRIAL APPLICABILITY

The broad applicability and unique acceptability of the products of this invention can be appreciated by reference to the following examples.

EXAMPLE 1

Thirteen consumers were asked to acquire or purchase packages of ground beef and to prepare them at home as they normally would for incorporation in spaghetti sauce, and return the prepared ground beef. This ground beef was sized on a series of screens, and the results were as follows:

TABLE I

| Consumer | On 12.7 mm Screen | On 9.51 mm Screen | On 5.66 mm Screen | On 4.76 mm Screen | Through 4.76 mm Screen |
|---|---|---|---|---|---|
| 1 | 18.6 | 18.0 | 37.2 | 10.9 | 15.3 |
| 2 | 19.4 | 18.5 | 36.0 | 7.6 | 18.5 |
| 3 | 14.8 | 24.2 | 34.7 | 6.4 | 19.9 |
| 4 | 3.1 | 11.9 | 38.8 | 11.0 | 35.2 |
| 5 | 0.0 | 1.1 | 34.7 | 17.9 | 46.3 |
| 6 | 0.0 | 0.0 | 22.3 | 18.0 | 59.7 |
| 7 | 12.9 | 22.3 | 37.1 | 7.6 | 20.1 |
| 8 | 35.0 | 19.5 | 26.5 | 3.5 | 15.5 |
| 9 | 2.5 | 15.3 | 44.1 | 8.4 | 29.7 |
| 10 | 0.0 | 6.4 | 36.8 | 17.1 | 39.7 |
| 11 | 13.8 | 24.5 | 34.2 | 6.6 | 20.9 |
| 12 | 0.0 | 3.2 | 40.3 | 11.3 | 45.2 |
| 13 | 1.9 | 6.8 | 42.7 | 13.6 | 35.0 |

In a separate experiment, consumer "Magnitude Estimation" studies were conducted, following the method of Moskowitz et al., *J. Can. Inst. of Food Science and Technology*, 10, 161–168 (1977), which is hereby incorporated herein by reference. A number of sauces containing analog or ground beef, at different levels of analog/beef and having different particle size, were poured over spaghetti and viewed by naive consumers. Preference results were statistically analyzed to establish a correlation between particle size and consumer preferenced, and to determine optimum ranges and particle sizes. This produced the particle size ranges described herein. It can be seen from these experiments that, typically, consumers do not prepare ground beef in a manner which most consumers perceive as ideal. It has also been determined that consumers do not prepare ground beef in a manner which they themselves perceive as ideal.

EXAMPLE 2

"Procon 7241F" textured soy protein, made by the A. E. Staley Company, Decatur, Ill., is comminuted, mixed with binders and flavors, agglomerated and sized in the manner described herein. The resulting analog fractions are added to "Ragu" brand spaghetti sauce to provide the following particle size distribution:

2%: on a 15.9 mm screen
20%: on a 12.7 mm screen
13%: on a 9.51 mm screen
32%: on a 5.66 mm screen
25%: through a 4.76 mm screen
balance: on a 4.76 mm screen The resulting composition is within the scope of this invention.

EXAMPLE 3

Vegetable protein extrudate particles prepared in accordance with U.S. Pat. No. 3,870,805, issued Mar. 11, 1975 to Hayes et al, are comminuted to an average particle size which will pass through a 4.76 mm screen. The resulting particles are mixed with flavors, water and egg white binder and the binder is set by heating. The resulting analog is sized by any convenient technique, and the resulting size fractions are added to a seasoned, chili-flavored sauce (with beans) to provide the following analog particle size distribution:

0%: on a 15.9 mm screen
9%: on a 12.7 mm screen
18%: on a 9.51 mm screen
37%: on a 5.66 mm screen
25%: through a 4.76 mm screen
balance: on a 4.76 mm screen The resulting composition is within the scope of this invention.

EXAMPLE 4

When the meat analog particles of Example 3 are placed in taco, barbecue, teriyaki or stroganoff sauce, the resulting composition is within the scope of this invention.

All percentages herein are by weight unless otherwise indicated.

What is claimed is:

1. A sauce comprising at least about 7% by volume of textured protein simulating loose cooked ground meat, but in which the textured protein has a particle size distribution of:
   (a) from 0% to about 2% on a 15.9 mm screen;
   (b) from about 6% to about 20% on a 12.7 mm screen;
   (c) from about 9% to about 18% on a 9.51 mm screen;
   (d) from about 27% to about 37% on a 5.66 mm screen;
   (e) from about 25% to about 40% through a 4.76 mm screen; and
   the balance on a 4.76 mm screen, provided that the sum of (a), (b), (c) and (d) is from about 48% to about 72%.

2. A sauce providing to claim 1 which has a Bostwick viscosity of from about 2.0 to about 5.0.

3. A sauce according to claim 2 comprising at least about 21% by volume of textured protein simulating loose cooked ground meat, but in which the textured protein has a particle size distribution of:
   (a) all particles through a 15.9 mm screen;
   (b) about 14% on a 12.7 mm screen;
   (c) about 15% on a 9.51 mm screen;
   (d) about 33% on a 5.66 mm screen;
   (e) about 30% through a 4.76 mm screen; and the balance on a 4.76 mm screen.

4. A sauce according to claim 3 which has a Bostwick viscosity of from about 3.5 to about 4.6.

5. A sauce according to claim 3 which has a pH of about 4.40 to about 4.60.

6. A spaghetti sauce according to claim 5.

7. A sauce according to claim 1 wherein the textured protein is a textured vegetable protein.

8. A sauce according to claim 7 wherein the textured vegetable protein is soy protein.

9. A sauce according to claim 3 wherein the textured protein is textured vegetable protein.

10. A sauce according to claim 9 wherein the textured vegetable protein is textured soy protein.

11. A sauce according to claim 1 containing about 7% to about 21% by volume of textured protein having a particle size distribution of:
   a. from about 0% to 1% on a 15.9 mm screen;
   b. from about 10% to about 16% on a 12.7 mm screen;
   c. from about 13% to about 16% on a 9.51 mm screen;
   d. from about 30% to about 35% on a 5.6 mm screen;
   e. from about 28% to about 32% through a 4.76 mm screen;
   and the balance on a 4.76 mm screen.

* * * * *